United States Patent [19]

Shaw

[11] Patent Number: 4,997,270

[45] Date of Patent: Mar. 5, 1991

[54] PROJECTED IMAGE ALIGNMENT METHOD AND APPARATUS

[75] Inventor: William C. Shaw, Streetsville, Canada

[73] Assignee: Imax Systems Corporation, Toronto, Canada

[21] Appl. No.: 365,633

[22] Filed: Jun. 13, 1989

[51] Int. Cl.$^5$ .............................................. G03B 35/00
[52] U.S. Cl. ...................................... 352/57; 352/62; 352/86; 352/63; 355/22
[58] Field of Search ........................ 352/57, 62, 63, 65, 352/59, 86; 354/74, 78, 116, 114, 123–125; 355/22; 358/88, 89, 92

[56] References Cited

U.S. PATENT DOCUMENTS

| | | | |
|---|---|---|---|
| 2,827,823 | 3/1958 | Shurcliff | 352/63 X |
| 2,854,883 | 10/1958 | Jones et al. | 352/59 X |
| 3,191,493 | 6/1965 | Mainardi et al. | 352/63 X |

Primary Examiner—Michael L. Gellner
Assistant Examiner—D. Rutledge
Attorney, Agent, or Firm—Rogers, Bereskin & Parr

[57] ABSTRACT

Projected image misalignment in a 3-D motion picture projector is corrected by shifting one of the projection lenses in accordance with a predetermined program during presentation of the motion picture. In one embodiment, manually initiated control signals for adjusting the lens shift are recorded in a memory and can be subsequently retrieved for automatically controlling lens shift. In another embodiment, lens shift is controlled by reading predetermined witness marks on the film.

16 Claims, 7 Drawing Sheets

PROJECTED IMAGE ALIGNMENT METHOD AND APPARATUS

FIELD OF THE INVENTION

This invention relates generally to the presentation of stereoscopic or three dimensional motion pictures (hereinafter called 3-D motion pictures) and is concerned more particularly with a projected image alignment method and apparatus.

BACKGROUND OF THE INVENTION

3-D motion pictures are generally produced by simultaneously photographing a subject using two motion picture cameras positioned to provide "left eye" and "right eye" views of the subject. The images recorded on films in those cameras are then simultaneously projected onto a screen and are optically coded in some way so that the left eye of the viewer sees only the images that were recorded by the "left eye" camera while the viewer's right eye sees only the "right eye" images. The viewer then perceives a stereoscopic or 3-D effect.

In the presentation of 3-D motion pictures, it is important that the two sets of images projected onto the screen are in proper alignment to avoid viewer eyestrain. Human eyes naturally move in unison. If the images are not projected in alignment, the viewer's left eye will attempt to follow the left eye images while the right eye will attempt to follow the right eye images. For example, image misalignments may result in the viewer trying to "cross" eyes vertically or diverge eyes ("walleye"). These unnatural eye movements result in muscle strain that may lead to discomfort or headaches.

It has been observed that proper image alignment is of particular importance when 3-D images are projected onto a dome-shaped screen.

Projected image misalignments can occur as a result of camera misalignment when the original films were made and due to errors and tolerance problems in making prints from the original films. The misalignments are partly random, but are often systematic, i.e. are likely to be reasonably constant during any individual scene in a film. Due to their partly random character, such misalignments cannot be compensated for by appropriate setting up of the projectors when the motion picture is presented.

An object of the present invention is to provide a method and an apparatus for correcting projected image misalignments.

SUMMARY OF THE INVENTION

In accordance with the invention, there is provided a method of correcting for projected image misalignment in the presentation of 3-D motion pictures in which respective series of "right eye" and "left eye" images are projected onto a screen. The method involves predetermining for one series of images over a selected period of time during which the motion picture is being shown (a) a series of adjusted positions to which the images are to be shifted to reduce or eliminate said projected image misalignment, and (b) a correlation between said positions and scenes appearing in said motion picture. The series of "right eye" and "left eye" images are then projected while repeatedly shifting the images of the said at least one series to said predetermined positions in accordance with said correlation.

Corrections can be made by shifting one series of images only while projecting the other series normally; however, both series of images may be shifted, as will be described in more detail later.

Image shift can be achieved by appropriately displacing the film from which the image is projected, or by optically shifting the projected image.

In this latter context, the invention also provides a 3-D motion picture projection apparatus adapted to project "right eye" and "left eye" images onto a screen from at least one film. The apparatus includes first and second projection lenses for the respective films, each lens having an optical axis, and an adjustable lens mount for at least one of said lenses adapted to permit shifting of the lens in directions normal to its said optical axis. Actuator means is provided for progressively shifting said at least one lens in said directions and means is provided for controlling the actuator means to repeatedly shift the lens to predetermined adjusted positions during presentation of a motion picture.

In other words, this aspect of the invention is based on the realization that it is possible to at least partially correct for image misalignments by shifting at least one of the projection lenses so as to bring the respective sets of images into proper alignment as far as is possible.

The control means may be programmable so that the predetermined adjusted positions of the movable lens can be stored in memory and recalled to automatically shift the lens as is required during presentation of the motion picture. Alternatively, the control means can "read" predetermined "witness" marks on the film associated with the shiftable projection lens.

BRIEF DESCRIPTION OF THE DRAWINGS

In order that the invention may be more clearly understood, reference will now be made to the accompanying drawings which illustrate a number of particular preferred embodiments of the invention by way of example, and in which.

DESCRIPTION OF THE PREFERRED EMBODIMENTS

The present invention has been devised primarily (but not exclusively) in connection with so-called "rolling loop" projectors of the type that are available from Imax Systems Corporation of Toronto, Canada under the registered trade marks IMAX and OMNIMAX. In projectors of this type, the film moves horizontally through the projector and upright subjects are recorded as images that extend transversely of the film.

Figure 1:
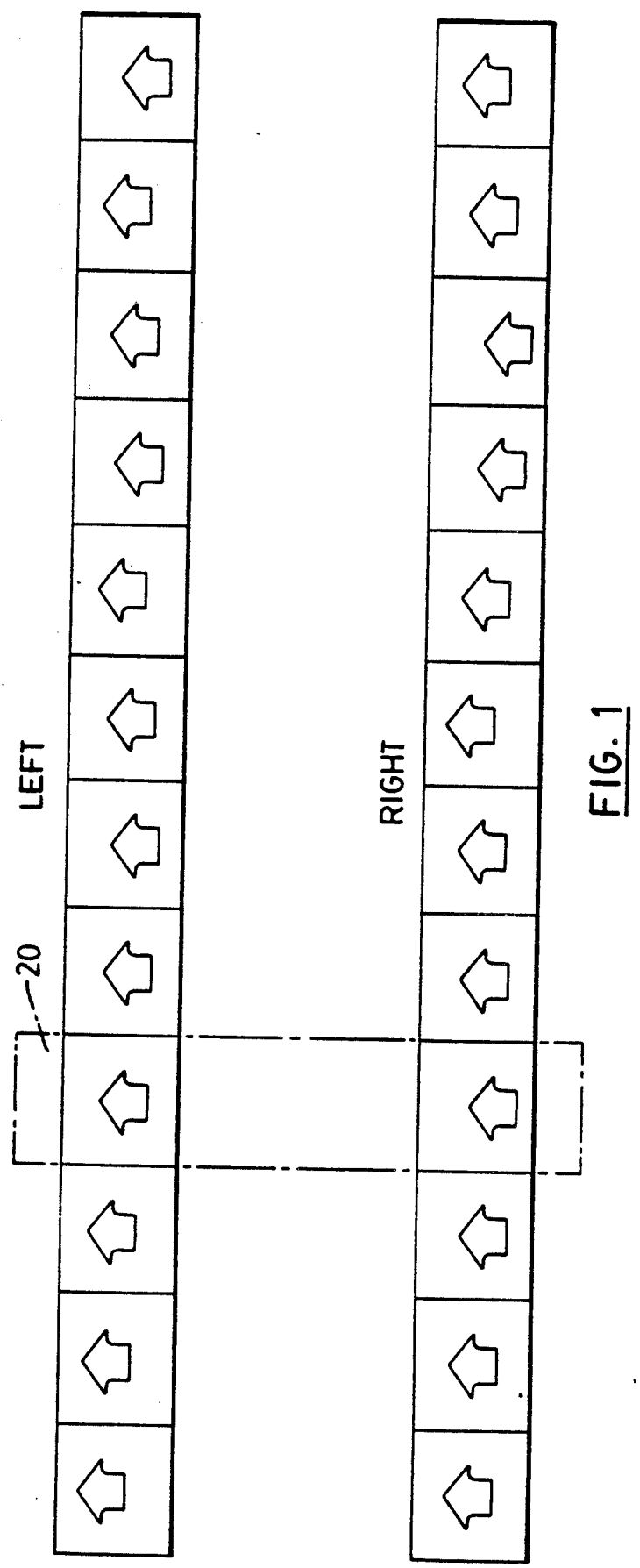
FIG. 1 is a diagrammatic representation of "left eye" and "right eye" film strips for 3-D projection, on which image misalignment has been illustrated.

FIG. 1 of the drawings is a schematic representation of two films of this type in which the images recorded on successive frames appear as upright arrows. In films of this type, image misalignments tend to occur in the transverse direction of the film (i.e. vertically). For illustrative purposes, the misalignments have been exaggerated in FIG. 1 as compared with those that would be encountered in actual practice, both in terms of the extent of the misalignment and the degree of misalignment between successive frames. Nevertheless, considering by way of example the two frames that are enclosed by the ghost outline denoted 20, it can be seen that the right eye image is substantially lower on the film than the left eye image. It can be appreciated that, if the images are projected simultaneously, then a serious misalignment problem will occur.

It can also be appreciated that, if the viewer tried to follow the successive left eye images from frame to frame with his or her left eye while at the same time trying to follow the corresponding right eye images with the right eye, significant eye muscle strain and discomfort would be likely to occur.

The present invention is based on the discovery that the misalignments that occur in practice can be eliminated or at least corrected for if the position of the image projected from at least one of the film strips is repeatedly adjusted to compensate for such misalignments. For example, one projected image can be adjusted to match as closely as possible the image projected from the other film strip, while no adjustment is made in respect of that image. In the embodiments of FIGS. 1 to 8, this is accomplished by shifting in the vertical direction the projection lens for the "right eye" film strip while leaving the "left eye" projection lens fixed.

Figure 2:
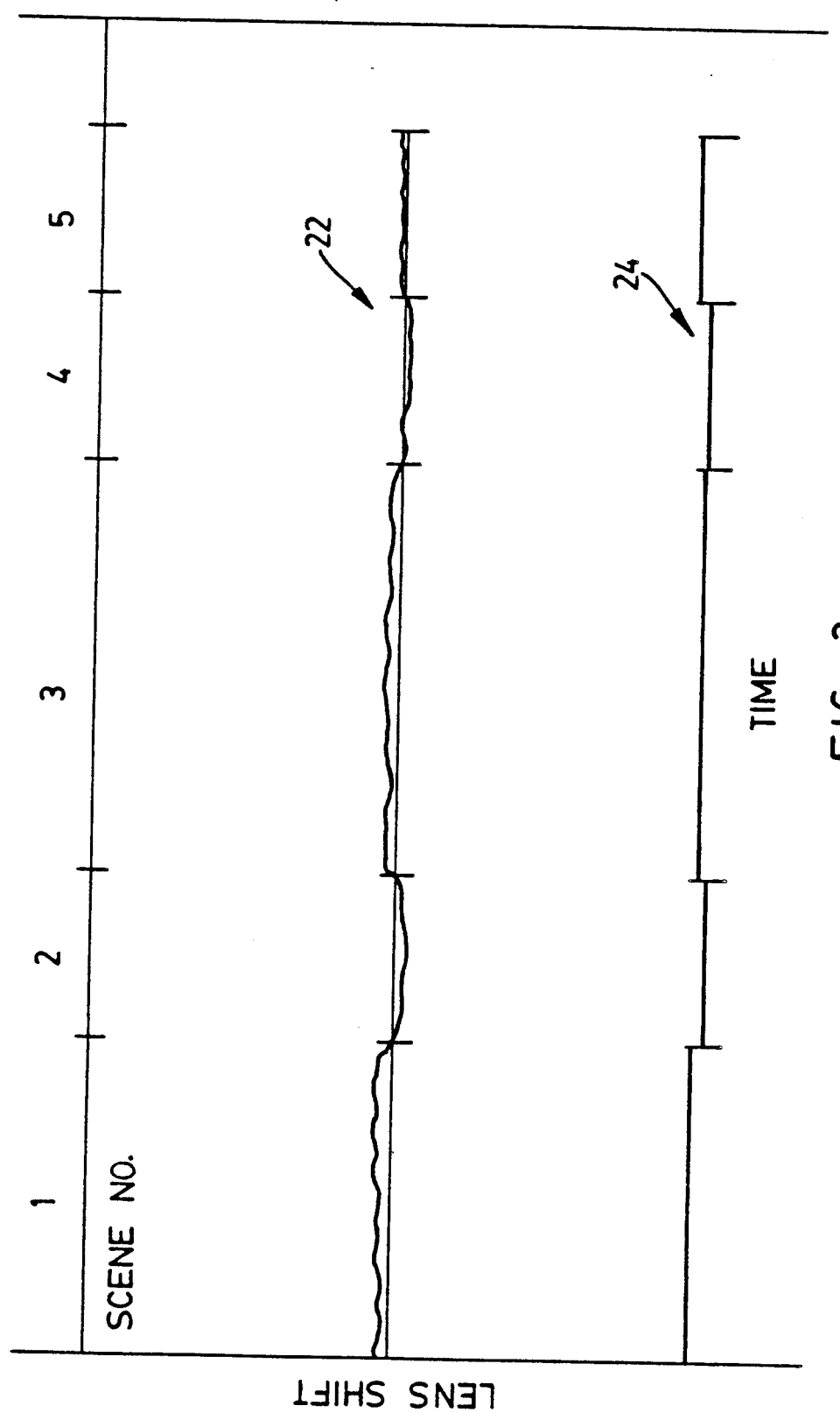
FIG. 2 is a diagram relating two different lens shift patterns to sequential scenes in a motion picture.

FIG. 2 is a diagram showing lens shift against time as related to a series of scenes in a motion picture. The scenes are identified by the numbers 1 to 5 and two trace patterns for compensating lens shift are indicated respectively at 22 and 24. Pattern 22 represents a continuous adjustment of the position of one of the lenses during five scenes of the film. The adjustment takes place about an axis representing a datum position and it will be seen that the lens moves both above and below the datum in effect moving opposite to the differential image misalignment that appears on the other film strips to reduce the positioning error.

Trace 24 illustrates a similar adjustment regimen but in which the lens is shifted for each scene of the film and remains generally in its shifted position throughout the duration of that scene. In this case, each shifted position may represent an average of an infinite number of "ideal" adjusted positions for that scene.

Figures 6, 7:
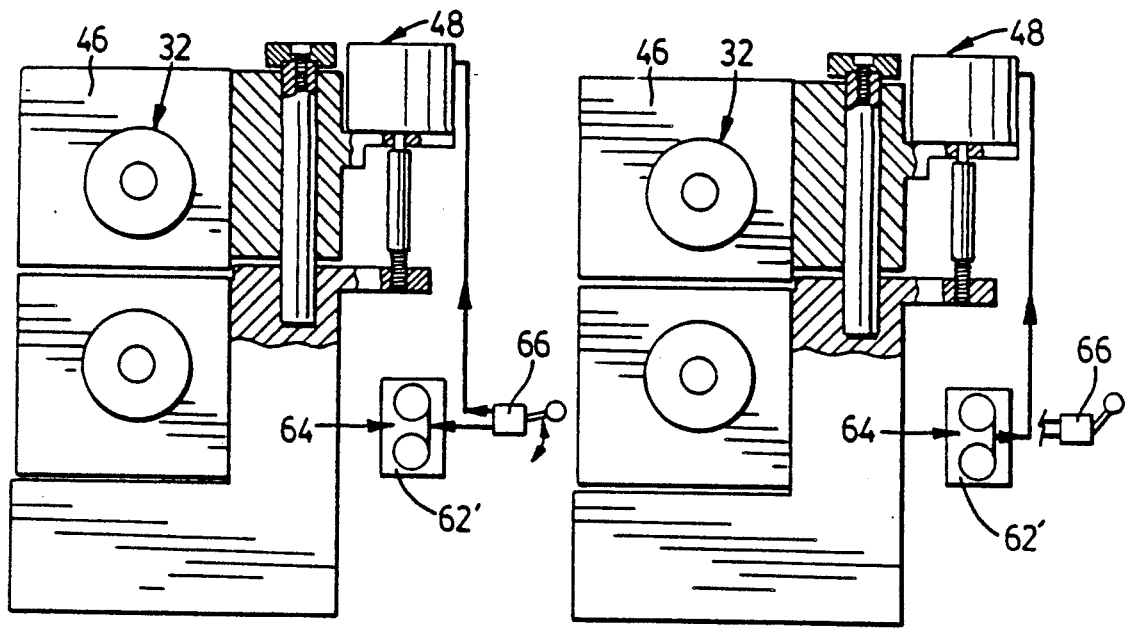
FIGS. 6 and 7 are sequential views illustrating one method of actuating the lens shift mechanism.
Figure 8:
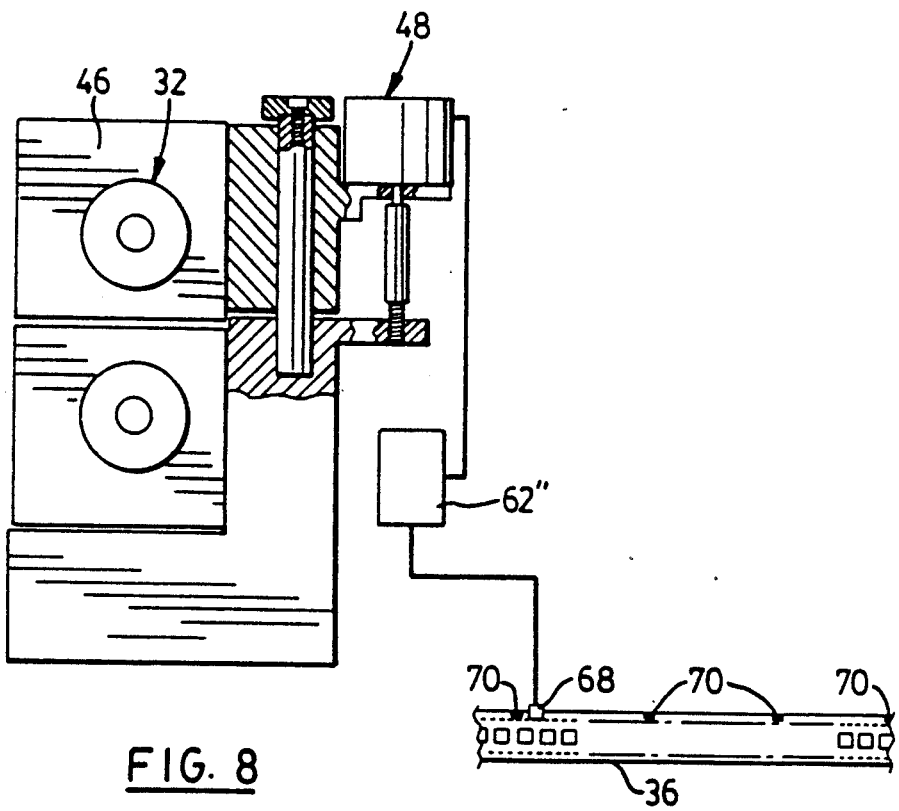
FIG. 8 is a schematic illustration of a second such method.

FIGS. 6 and 7 illustrate a method of continuous shift adjustment that might produce trace 22 while FIG. 8 shows a method that might produce trace 24. Those views will be described in more detail later.

Figure 3:
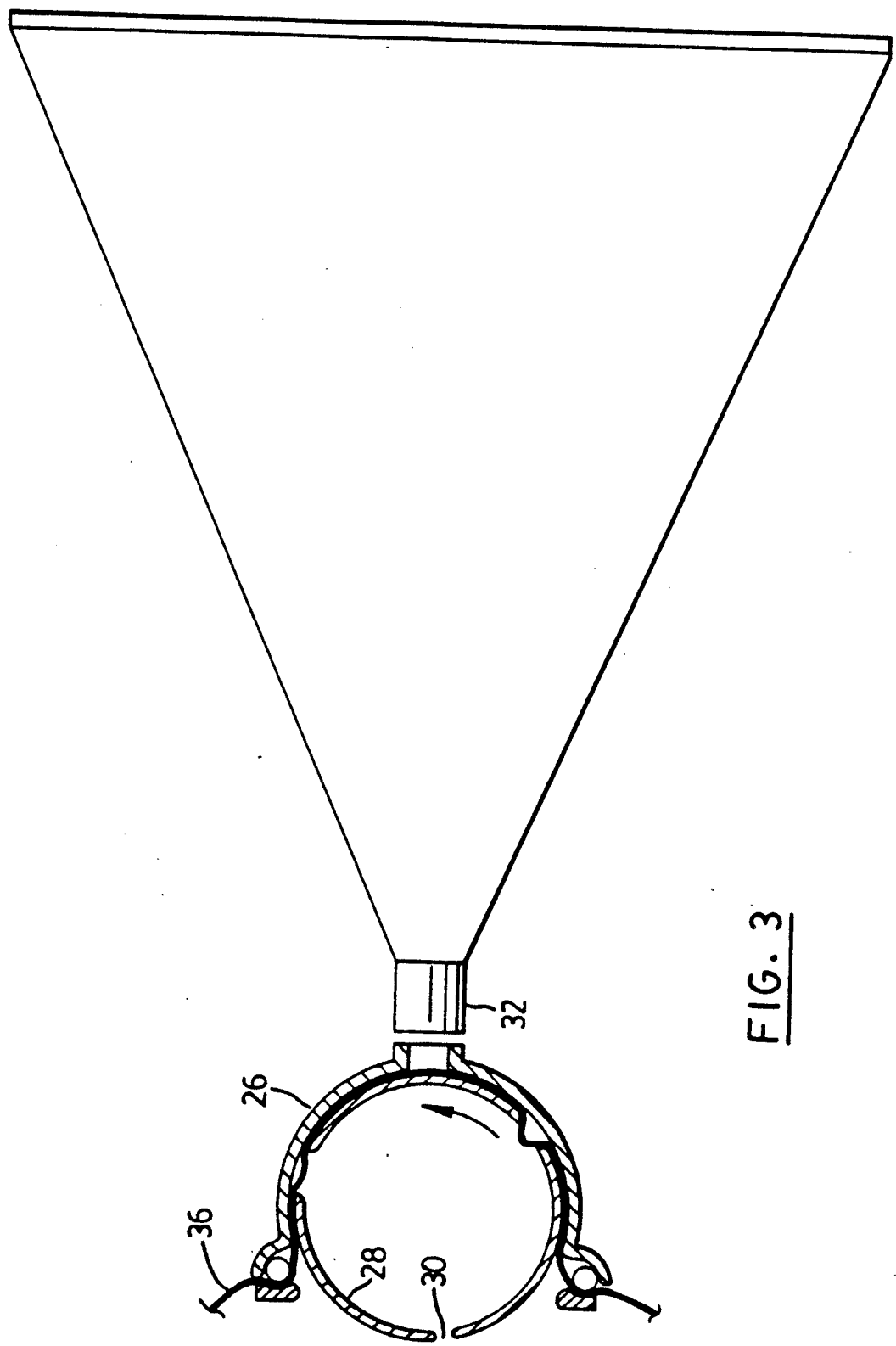
FIGS. 3 and 4 are schematic plan and side elevational views respectively of a 3-D motion picture projection apparatus in accordance with the invention.
Figure 4:
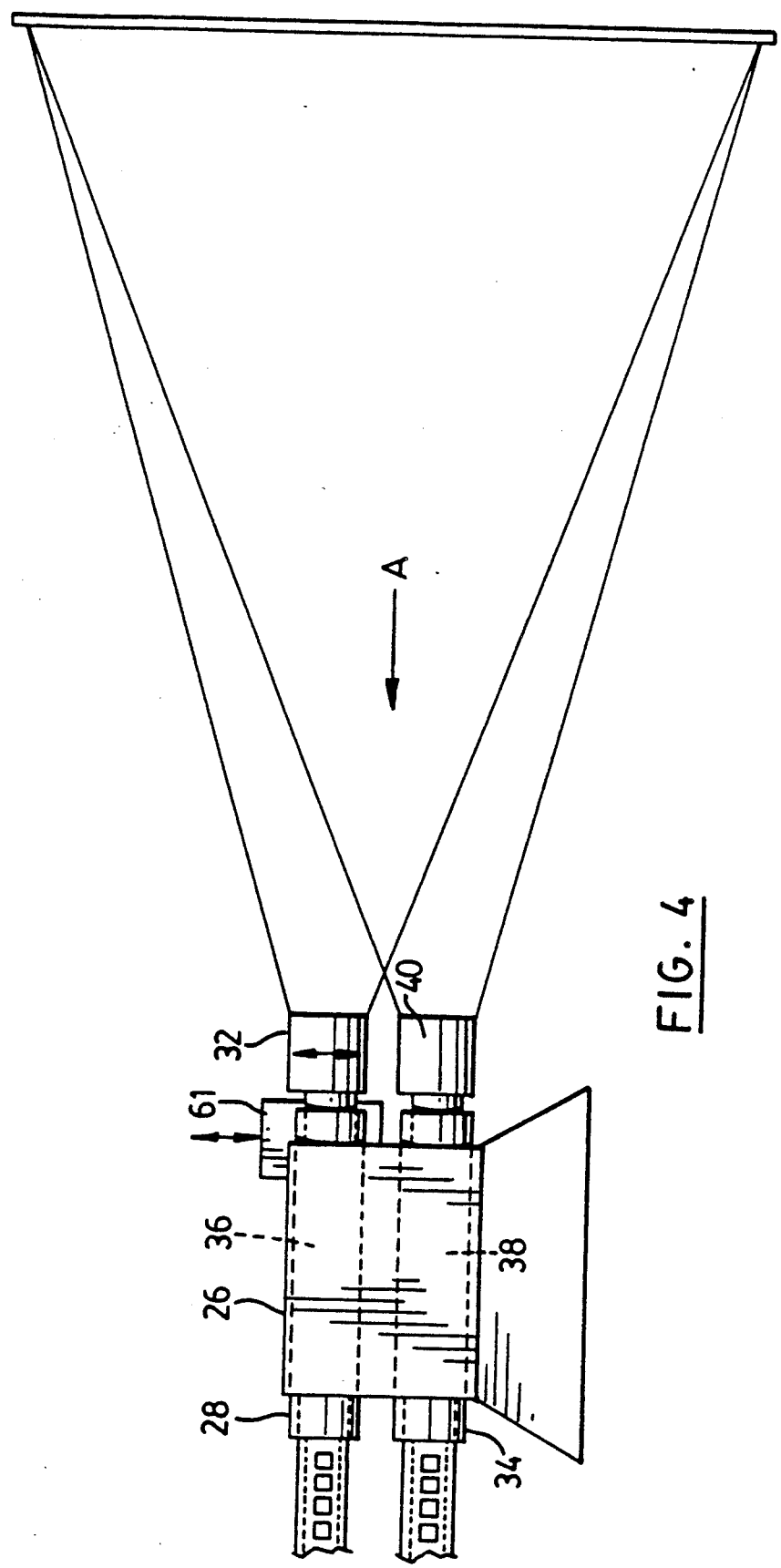

In the meantime, reference will be made to FIGS. 3, 4 and 5 in describing a projector for 3-D motion pictures. FIGS. 3 and 4 show the principal components of the projector. The projector is essentially two vertically "stacked" IMAX projectors of the general form described in U.S. Pat. No. 3,600,073 (Shaw) the disclosure of which is incorporated herein by reference. Essentially, the projector comprises a stationary stator 26 and a rotor 28 which rotates inside the stator and which includes a series of gaps 30 for receiving loops of film. As the rotor rotates, the loops progressively form and decay, advancing the film. A projection lens at a projection aperture is indicated at 32.

As best seen in FIG. 4, the particular projector shown in fact has two superposed rotors, the upper one of which is the rotor 28 referred to previously while the lower rotor is denoted 34, and a common stator 26. In this embodiment, the "right eye" film (denoted 36) is transported by the upper rotor 28 while the "left eye" film (denoted 38) is transported by the lower rotor 34. A projection lens associated with the lower rotor is indicated at 40. The two lenses are designed and oriented to project co-incident images onto a screen.

Figure 5:
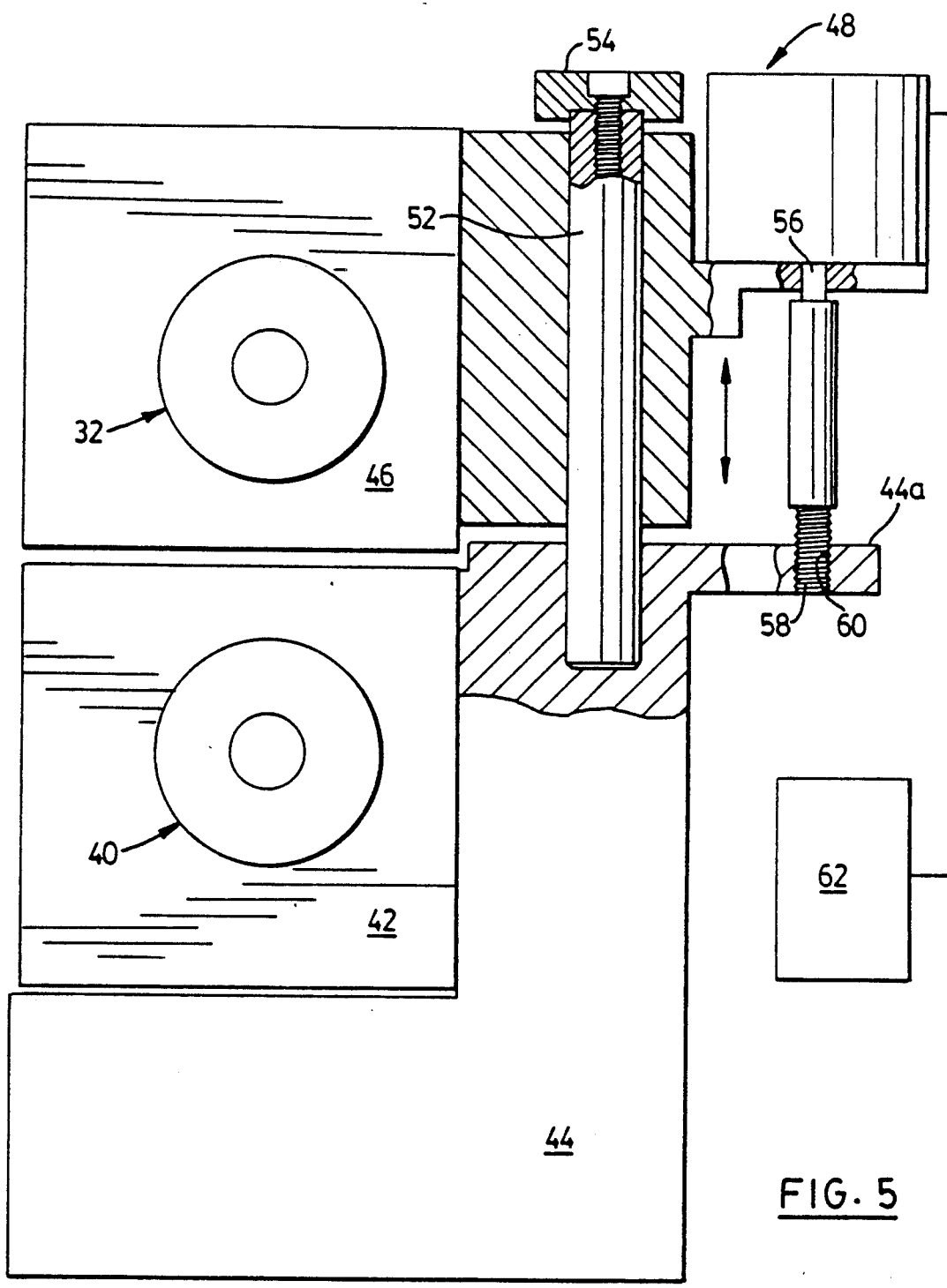
FIG. 5 is an enlarged detail view showing the lens shift mechanism of the apparatus of FIGS. 3 and 4.

FIG. 5 is a view in the direction of arrow A in FIG. 4 and shows the two lenses 32, 40. The remaining components of the projector have been omitted. Lens 40 is carried in a lens mount 42 which is in turn carried by a support block 44 fixed to the frame of the projector. Lens 32 on the other hand is carried by a lens mount 46 that can be vertically shifted to compensate for projected image misalignment as discussed previously. Vertical movement of lens mount 46 is accomplished by an actuator 48 in the form of a servomotor that is supported by a bracket 50 attached to lens mount 46. The bracket is guided for vertical sliding movement on a post 52 fitted into block 44. A cap 54 is provided on post 52. A rotary output shaft 56 extends vertically downwardly from servomotor 48 and has a threaded lower end portion 58 that is received in a complementarily threaded bore 60 in a flange 44a on block 44. Accordingly, as servomotor 48 turns, its output shaft 56 will turn, causing its threaded lower end portion 58 to move vertically through bore 60 in view of its screw-threaded connection to flange 44a. In turn, the whole servomotor will move correspondingly and will carry with it the lens mount 46 and lens 32.

In an alternate embodiment, a similar arrangement could be used to vertically shift the film instead of the projection lens. For example, referring to FIG. 4, film 36 could run through a film guide (such as the guide diagrammatically indicated at 61) designed to be vertically shifted by an actuator (not shown) similar to actuator 48.

Referring back to FIG. 5, reference numeral 62 indicates control means for actuator 48. As indicated previously, the control means may take a number of forms but basically will cause servomotor 48 to operate to shift lens 32 to predetermined adjusted positions during showing of a motion picture, to compensate for lens misalignment.

Two alternative forms of control means are shown, one in FIGS. 6 and 7 and the other in FIG. 8.

As seen in FIGS. 6 and 7, the control means is denoted 62' and essentially is adapted to automatically control actuator 48 in accordance with a predetermined program stored in a memory indicated at 64. Memory 64 is in turn programed by a manual control unit 66 for actuator 48. In order to program the memory 64, control unit 66 is manually operated while viewing the motion picture to provide the required shift corrections in the position of lens 32. Memory 64 "remembers" the control signals that were manually imparted to actuator 48 during programming and the control unit can thereafter be disconnected and the actuator controlled automatically during showing of the motion picture from the information stored in memory 64, as illustrated in FIG. 7. Readout from memory 64 is synchronized with the film by timing from a pre-set "start" position on the film (e.g. a "witness" mark).

Trace 22 in FIG. 2 illustrates the pattern in which lens 32 might be adjusted by an automatic system of the form shown in FIGS. 6 and 7.

Instead of using "raw" manually adjusted positions, the control unit could be designed to calculate an average adjusted position for each scene and the average settings stored in memory for subsequent read out during projection.

The shift arrangement illustrated in FIGS. 5, 6 and 7 can of course be duplicated for the other lens if both lenses are to be shifted.

The system shown in FIG. 8 is designed to adjust the position of lens 32 for each scene of the film as indicated by trace 24 in FIG. 2, and again could be duplicated for the other lens.

As shown in FIG. 8, the control means is denoted 62" and operates actuator 48 in response to a signal from a reader 68 associated with the "right eye" film 36. Witness marks 70 are provided on the film at the beginning of each scene. Reader 68 detects the location of each witness mark. If a particular mark is not in a pre-determined vertical position with respect to the reader (e.g. centered), control unit 62" sends a control signal to actuator 48 to move lens 32 by an amount necessary to correct the position of the projected image. In an embodiment in which the film is shifted (instead of the lens), control unit 62" would cause the film to be shifted by an amount necessary to bring the witness mark to the required pre-determined position with respect to the reader. Again, the position of the witness marks on the film may be determined by viewing the film, visually assessing the corrective adjustment of the lens that is required and then placing the marks on the film. The witness marks could be photographically recorded on the film by the camera, although such an arrangement would result in compensation only for misalignments that are caused by printing irregularities (not incorrect camera set ups). Witness marks could of course be associated with each frame and the lens shifted on the basis of frame by frame information.

Another possibility is to provide witness marks on both film strips, read both sets of witness marks, determine the differential lens shift required in order to achieve projected image alignment, and apply opposite shift to one lens or equal and opposite shifts to both lenses. For example, FIG. 9 is a diagram that illustrates how projected left and right eye images in a 3-D projection system might be misaligned prior to correction in accordance with the method of the invention.

Figure 9:
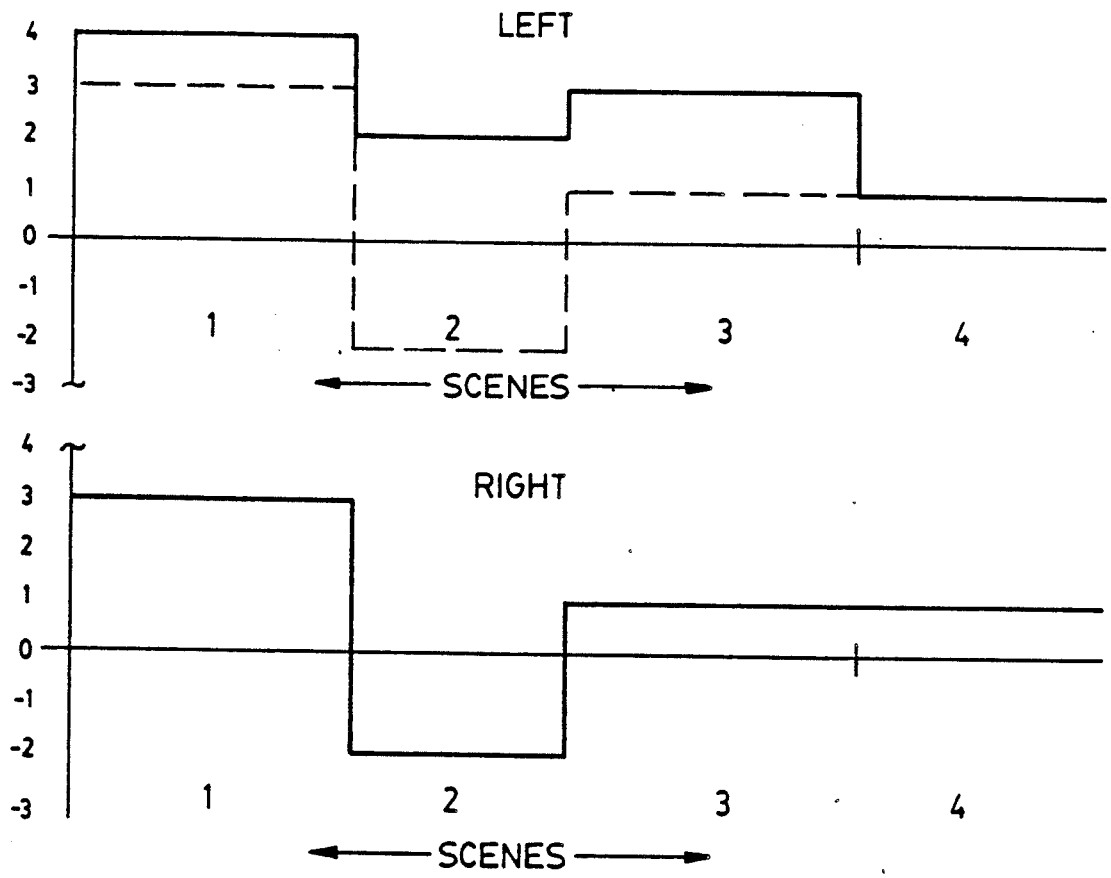
FIG. 9 is a diagram showing shift patterns for both lenses of a 3-D system; and, FIG. 10 is a diagrammatic illustration of an alternative arrangement for shifting the lenses.

Referring to FIG. 9, in the first scene, the left eye image has shifted four incremental units above a notional datum line (zero position) whereas the right eye image is shifted only three units a corresponding datum line for the right eye image (if the two images were on the respective datum lines, the projected images would be aligned on the screen). In the second scene the left eye image has shifted two units above the datum line while the right eye image is shifted two units below that line. In scene 3 the left eye image is three units above the datum line while the right eye image is only one unit above that line. Finally, in the fourth scene, both images are one unit above the datum line.

Witness marks associated with the two film strips indicate the displaced positions of the images and are read by appropriate readers. Appropriate electronic circuitry compares the two readings and generates a signal that applies the appropriate correction to one of the two lenses (e.g. the left lens) by means of an actuator arrangement of the form shown in FIG. 5. In the first scene the differential image shift is +1 unit so the left eye image would be shifted −1 unit; that is, to the +3 unit position indicated by the dotted line in the left eye diagram. For the second scene, the differential is four units and the control means would be arranged to move the left eye lens four units in the negative direction again to the dotted line position shown. For the third scene, the differential is two units and the left eye lens would be moved down two units to co-incide with the right eye lens position. For the fourth scene, no correction is required.

Figure 10:
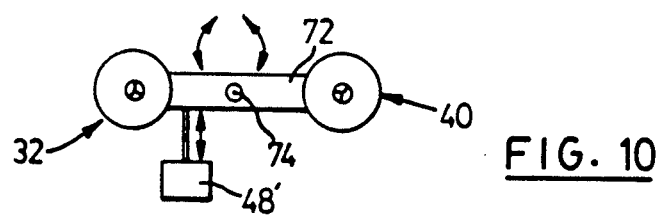

Instead of shifting only one lens, both lenses could be shifted by equal and opposite amounts, for example by an arrangement such as that shown diagramatically in FIG. 10. That view shows the two lenses of the projection system as seen in front elevation. The lenses are coupled to opposite end portions of an arm 72 that is pivoted about a horizontal axis 74 midway between and parallel to the optical axes of the lenses. An actuator 48' is coupled to arm 72 for moving the arm about its pivot axis. It will be appreciated that incremental displacement of arm 72 about its pivot up or down will cause corresponding movement of the two lenses by equal and opposite amounts. The amount by which each lens would be shifted would of course be equal to half of the differential shift between the two images on the film.

It will of course be understood that the preceding description relates to particular preferred embodiments of the invention only and that many modifications are possible within the broad scope of the invention. Some of those modifications have been indicated previously and others will be apparent to a person skilled in the art.

It should in particular be emphasized that, while the preferred embodiments relate primarily to optical shifting of the projected image from one of two films by moving the projection lens, the invention is not limited to embodiments of this type. Both images could be shifted. Image shift could be achieved by shifting the film, for example by routing the film through a film guide which is displaceable in similar fashion to the projection lens described previously (see e.g. film guide 61 in FIG. 4). Where optical image shifting is employed, the required image shift may be achieved by tilting or otherwise moving lenses, lens elements or prisms in the projection system rather than by bodily shifting the complete lens as in the preferred embodiments described previously.

The "left eye" and "right eye" images may be recorded on the same piece of film and projected through respectively different lenses, or through the same lens with appropriate shift for alternate images.

The invention has been described specifically in the context of a rolling loop type film projection system. However, there is no limitation in this respect; the method provided by the invention may be applied to other types of projectors. In the environment of rolling loop projectors, two separate projectors could of course be employed.

It should finally be noted that, while the description with reference to the drawings specifically mentions adjustment of one of the lenses in the vertical direction, there is no limitation in this respect. Horizontal adjustment could similarly be achieved. Further, it would be possible to provide for both horizontal and vertical adjustment although it would then be necessary to provide separate actuators and appropriate control signals for both directions of movement.

I claim:

1. A method of correcting for projected image misalignment in the presentation of 3-D motion pictures in which respective series of "right eye" and "left eye" images are projected onto a screen, the method comprising the steps of:

predetermining for at least one of said series of images and over a predetermined period of time during which said motion picture is to be shown (a) a series of successive adjusted positions to which the images are to be shifted to reduce or eliminate projected image misalignment, and (b) a correlation between said positions and scenes appearing in said motion picture; and, projecting said "right eye" and "left eye" series of images while repeatedly shifting the images of said at least one series to said predetermined adjusted positions in accordance with said correlation.

2. A method as claimed in claim 1, wherein the respective series of images are projected through optical projection means, and wherein the image shift for said at least one series of images is achieved optically by repeatedly adjusting said optical projection means during projection of said images.

3. A method as claimed in claim 2, wherein said optical projection means comprises respective projection lenses for the "right eye" and "left eye" images, each said lens having an optical axis, and wherein the image shift for said at least one series of images is effected by shifting one of said lenses in directions normal to its optical axis.

4. A method as claimed in claim 1, wherein said correlation is achieved by providing witness marks on a film from which said one series of images are projected, reading said marks as the film is shown and shifting said images in response to said reading.

5. A method as claimed in claim 4, wherein witness marks are provided in association with each from on the film and said images are shifted in response to frame-by-frame information.

6. A method as claimed in claim 3, wherein said correlation is achieved by manually adjusting the lens position while reading into memory a record of said adjusted positions related in time to scenes in said motion picture, whereby said record may be read out of the memory and used automatically to adjust the lens shift during subsequent showings of said motion picture.

7. A method as claimed in claim 6, wherein said record of adjusted positions is a calculated average adjusted lens position for each scene.

8. A method as claimed in claim 1, wherein said step of repeatedly shifting the images of said at least one series comprises shifting said images to a single adjusted position for each scene in said presentation.

9. A method as claimed in claim 3, wherein said lens is adapted to be shifted in vertical directions normal to its optical axis, to compensate for vertical misalignment of the projected image.

10. A method of correcting for projected image misalignment in the presentation of 3-D motion pictures in which "right eye" and "left eye" images are projected onto a screen from at least one film through projection lenses having respective optical axes, the method comprising the steps of:

predetermining for one of said lenses and over a predetermined period of time during which said motion picture is to be shown (a) a series of successive adjusted positions to which the lens is to be shifted in a direction normal to its said optical axis to reduce or eliminate misalignment of images projected from said lens with images projected from the other lens, and (b) a correlation between said positions and scenes appearing in said motion picture; and, running said at least one film while repeatedly shifting said lens to said predetermined adjusted positions in accordance with said correlation.

11. In the presentation of 3-D motion pictures in which respective series of "right eye" and "left eye" images are projected onto a screen;

the improvement comprising:

predetermining for at least one of said series of images and over a predetermined period of time during which said motion picture is to be shown (a) a series of successive adjusted positions to which the images are to be shifted to reduce or eliminate projected image misalignment, and (b) a correlation between said positions and scenes appearing in said motion picture; and, projecting said "right eye" and "left eye" series of images while repeatedly shifting said at least one series of images to said predetermined adjusted positions in accordance with said correlation.

12. A 3-D motion picture projection apparatus in which "right eye" and "left eye" images are projected onto a screen, wherein the apparatus includes first and second projection lenses for the respective films, each of said lenses having an optical axis; an adjustable lens mount for at least one of the said lenses adapted to permit shifting of said lens in a direction normal to its optical axis, actuator means for progressively shifting the lens in said direction, and means for controlling said actuator means to repeatedly shift said at least one lens to predetermined adjusted positions during showing of a motion picture.

13. An apparatus as claimed in claim 12, wherein said actuator means is an electric servomotor.

14. An apparatus as claimed in claim 12, wherein said direction of lens shift is vertical.

15. An apparatus as claimed in claim 12, wherein said means for controlling said actuator means includes a programmable memory operable to automatically control lens shift in relation to scenes in the motion picture.

16. An apparatus as claimed in claim 12, wherein said means for controlling said actuator means includes a reader for witness marks on the film to be projected through said lens, said control means being adapted to shift the lens during predetermined scenes on the film to correct image misalignment.

* * * * *

UNITED STATES PATENT AND TRADEMARK OFFICE
CERTIFICATE OF CORRECTION

PATENT NO.   : 4,997,270
DATED        : March 5, 1991
INVENTOR(S)  : William C. Shaw It is certified that error appears in the above-identified patent and that said Letters Patent is hereby corrected as shown below:

ON TITLE PAGE:

Item [19]", change "Shaw" to --Shaw, et al.--.

Item [75], change "Inventor" to --Inventors-- and insert below "William C. Shaw, Streetsville, Canada": --Simon Chi Yuen Kwan, Mississauga, Canada--.

Signed and Sealed this

Fifth Day of May, 1992

Attest:

DOUGLAS B. COMER

Attesting Officer

Acting Commissioner of Patents and Trademarks